UNITED STATES PATENT OFFICE.

JAKOB SCHMID AND KARL JEDLICKA, OF BASLE, SWITZERLAND, ASSIGNORS TO SOCIETY OF CHEMICAL INDUSTRY IN BASLE, OF SAME PLACE.

BLUE TRISAZO DYE.

SPECIFICATION forming part of Letters Patent No. 583,635, dated June 1, 1897.

Application filed August 25, 1896. Serial No. 603,850. (Specimens.)

*To all whom it may concern:*

Be it known that we, JAKOB SCHMID and KARL JEDLICKA, citizens of the Swiss Republic, residing at Basle, Switzerland, have invented certain Improvements in the Manufacture of Trisazo Dyestuffs, of which the following is a specification.

We have found that the monoazo coloring-matters resulting from the combination of one molecule diazo-benzoic-acid compounds (chlorid or other salts of diazo-benzoic acids and their ethers or amids) with one molecule of an amidonaphthol-disulfonic acid in acid solution, although of themselves of no value as dyestuff, may be, however, utilized for the production of valuable and successful blue trisazo dyestuffs, when one molecule of the tetrazo derivative paradiamido base of the series of diphenyl—such, for example, as benzidin, tolidin, dianisidin, methylbenzidin, and ethoxybenzidin—is combined with one molecule of the said monoazo coloring-matters and one molecule of a naphtholic compound—such, for example, as naphthols, amidonaphthols, oxynaphthols, naphthol-sulfonic acids, amidonaphthol-sulfonic acids, and oxynaphtholsulfonic acids. These trisazo dyestuffs, which all contain three diazo groups, are all powders of bronze luster. They dye unmordanted cotton from dark blue to greenish blue in alkaline bath. The preparation of these new trisazo dyestuffs is preferably executed in three successive operations, comprising, first, the production of the monoazo coloring-matter derived from amidonaphthol-disulfonic acid and a diazo-benzoic-acid compound; second, the combination of one molecule of the monoazo coloring-matter thus produced with one molecule of the tetrazo derivative of a paradiamido base of the series of diphenyl, and, third, the combination of one molecule of the intermediate product thus obtained with one molecule of the naphtholic compound.

By way of example, we will now describe the production of the blue trisazo dyestuff derived from metadiazo-benzoic acid, amidonaphthol-disulfonic acid 1.8.3.6, tetrazodianisidin and amidonaphthol-disulfonic acid 1.8.3.6.

I. *Preparation of the monoazo coloring-matter derived from metadiazo-benzoic acid and amidonaphtholdisulfo-acid 1.8.3.6.*—6.9 kilograms meta-amido-benzoic acid are dissolved in about two hundred liters water, to which fifteen kilograms hydrochloric acid of thirty per cent. have been added and diazotized by means of 3.5 kilograms sodium nitrite at a temperature of 5° to 10° centigrade. The solution of metadiazo-benzoic acid thus obtained is poured into a solution of sixteen kilograms amidonaphthol-disulfonic acid 1.8.3.6 and of 2.7 kilograms of sodium carbonate in about two hundred liters water, care being taken to agitate and to cool the mixture. The product of reaction separates as brown red flakes. The mixture is advantageously let stand for about ten hours for accomplishing the reaction.

II. *Preparation of the intermediate product.*—12.2 kilograms dianisidin are transformed in a well-known manner into the corresponding tetrazo derivative by means of hydrochloric acid and sodium nitrite. The tetrazo body thus obtained is poured into a solution of the monoazo coloring-matter obtained, as specified under "I," which solution is prepared by adding twenty kilograms of sodium carbonate to the liquid into which the monoazo coloring-matter has been produced, care being taken to agitate and to cool the mixture. The primitive red coloration of the mixture turns rapidly to intense black violet. The reaction is terminated after about one-half hour. The intermediate product obtained remains in solution and can, however, be precipitated by sea-salt in form of black flakes. The obtained solution of the intermediate product is directly employed for the preparation of the trisazo dyestuff.

III. *Combination of the intermediate product*

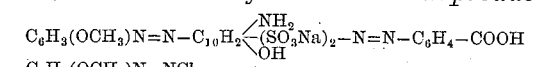

*with one molecule amidonaphtholdisulfo-acid 1.8.3.6.*—Sixteen kilograms amidonaphthol-disulfo-acid 1.8.3.6 are dissolved in water, which has added to it five kilograms of sodium carbonate. The solution thus obtained is mixed with the solution of the intermediate product prepared as described under "II." After the mass has been allowed to stand for about twelve hours the mixture becomes green blue in color. The mass is then heated to about 80° centigrade and the coloring-matter precipitated by adding common salt. The precipitate is collected and dried. This dyestuff is, in a dry state, a powder of bronze luster, which dissolves easily in water with green-blue coloration. It dyes unmordanted cotton in an alkaline bath greenish blue. It is insoluble in alcohol, ether, and benzene, and dissolves in concentrated sulfuric acid with blue coloration. By adding water to its solution in concentrated sulfuric acid the dyestuff is precipitated. In this process the metadiazo-benzoic acid can be replaced by orthodiazo-benzoic acid, paradiazo benzoic acid, or by the ethers and the amids of the diazo-benzoic acids, and for the amidonaphtholdisulfo-acid 1.8.3.6, which is combined with one of these diazo bodies to form the monoazo coloring-matter, can be substituted the isomeric amidonaphtholdisulfo-acids 1.8.4.6 and 1.5.3.7. For the preparation of the intermediate product the tetrazodianisidin can also be replaced by the tetrazo derivatives of benzidin, tolidin, methylbenzidin, and ethoxybenzidin. Instead of combining the intermediate product with amidonaphtholdisulfo-acid 1.8.3.6, it can be combined with the isomeric amidonaphtholsulfo-acid 1.8.4.6 or 1.5.3.7, amidonaphtholmonosulfo-acid 1.8.4 or 1.8.5, dioxynaphthalenemonsulfo-acid 1.8.4 or 2.8.6, naphtholmonosulfo-acid 1.4 or 1.5, alpha or beta naphthol, or amidonaphthol.

All the trisazo dyestuffs thus produced dye directly unmordanted cotton in tints varying from dark blue to greenish blue, and can be represented by the general formula:

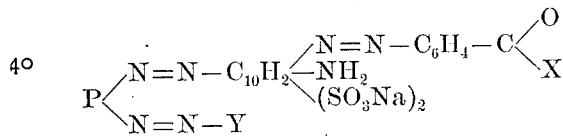

where X is to designate a hydroxyl, alkyloxy, or amido group; P, the radical of the tetrazo derivative of a paradiamido base of the series of diphenyl, and Y a naphtholic compound. They are, when dried, powders of bronze luster, easily soluble in water, with coloration varying from dark blue to green blue, insoluble in alcohol, ether, and benzene, soluble in concentrated sulfuric acid with blue coloration. By adding water to their solutions in concentrated sulfuric acid the trisazo dyestuffs are precipitated.

What we claim is—

1. The herein-described process for the manufacture of new blue trisazo dyestuffs, which consists in combining one molecule of the tetrazo derivative of a paradiamido base of the series of diphenyl, with one molecule of a monoazo coloring-matter derived from one molecule of an amidonaphthol-disulfonic acid and one molecule of a diazo-benzoic-acid compound, and one molecule of a naphtholic compound, such for example, as naphthols, amidonaphthols, oxynaphthols, naphthol-sulfonic acids, amidonaphthol-sulfonic acids and oxynaphthol-sulfonic acids, as set forth.

2. The herein-described process for the manufacture of new blue trisazo dyestuffs, which consists in combining one molecule of the tetrazo derivative of a paradiamido base of the series of diphenyl, with one molecule of the monoazo coloring-matter derived from one molecule of amidonaphtholdisulfo-acid 1.8.3.6 and one molecule of a metadiazo-benzoic-acid compound and with one molecule of a naphtholic compound such for example, as naphthols, amidonaphthols, oxynaphthols, naphthol-sulfonic acids, amidonaphthol-sulfonic acids and oxynaphthol-sulfonic acid, as set forth.

3. The herein-described process for the manufacture of new blue trisazo dyestuffs, which consists in combining one molecule of the tetrazo derivative of a paradiamido base of the series of diphenyl, with one molecule of the monoazo coloring-matter derived from one molecule of amidonaphtholdisulfo-acid 1.8.3.6 and one molecule of a metadiazo-benzoic-acid compound and with one molecule of an amidonaphtholsulfo-acid, as set forth.

4. The herein-described process for the manufacture of new blue trisazo dyestuffs, which consists in combining one molecule of the tetrazo derivative of a paradiamido base of the series of diphenyl, with one molecule of the monoazo coloring-matter derived from one molecule of amidonaphtholdisulfo-acid 1.8.3.6 and one molecule of a metadiazo-benzoic-acid compound and with one molecule of an amidonaphtholsulfo-acid, as set forth.

5. As a new article of manufacture, the herein-described blue trisazo dyestuff, which is, in its dry state, a powder of bronze luster, insoluble in alcohol, ether and benzene, soluble in water with a dark blue to green coloration and capable of dyeing unmordanted cotton in dark-blue to greenish-blue tints fast to light and to alkalies and which, when dissolved in concentrated sulfuric acid imparts a blue color to the solution, from which the dyestuff may be precipitated by an addition of water, as set forth.

In witness whereof we have hereunto signed our names in the presence of two subscribing witnesses.

JAKOB SCHMID.
KARL JEDLICKA.

Witnesses:
GEORGE GIFFORD,
AUGUST ROOS.